United States Patent
Guo et al.

(10) Patent No.: US 12,460,144 B2
(45) Date of Patent: Nov. 4, 2025

(54) HIGH-ENERGY-DENSITY SLURRY FUEL, PREPARATION METHOD, AND APPLICATION

(71) Applicant: HUBEI INSTITUTE OF AEROSPACE CHEMICAL TECHNOLOGY, Hubei (CN)

(72) Inventors: Xiang Guo, Hubei (CN); Wei Li, Hubei (CN); Fang Wang, Hubei (CN); Gen Tang, Hubei (CN); Wei Wang, Hubei (CN); Xiaomeng Fu, Hubei (CN); Yu Shi, Hubei (CN); Pu Huang, Hubei (CN); Chengshuo Cao, Hubei (CN); Xinke Sun, Hubei (CN)

(73) Assignee: HUBEI INSTITUTE OF AEROSPACE CHEMICAL TECHNOLOGY, Hubei (CN)

( * ) Notice: Subject to any disclaimer, the term of this patent is extended or adjusted under 35 U.S.C. 154(b) by 0 days.

(21) Appl. No.: 18/686,518

(22) PCT Filed: Aug. 26, 2022

(86) PCT No.: PCT/CN2022/114974
§ 371 (c)(1),
(2) Date: Feb. 26, 2024

(87) PCT Pub. No.: WO2023/025265
PCT Pub. Date: Mar. 2, 2023

(65) Prior Publication Data
US 2024/0360374 A1    Oct. 31, 2024

(30) Foreign Application Priority Data
Aug. 26, 2021   (CN) .......................... 202110988405.0

(51) Int. Cl.
*C10L 10/04*   (2006.01)
*C10L 1/12*    (2006.01)

(52) U.S. Cl.
CPC ............. *C10L 1/1216* (2013.01); *C10L 10/04* (2013.01); *C10L 2200/0209* (2013.01);
(Continued)

(58) Field of Classification Search
CPC .................. C10L 1/1216; C10L 10/04; C10L 2200/0209; C10L 2200/0218;
(Continued)

(56) References Cited

FOREIGN PATENT DOCUMENTS

| CN | 109337719 | | 2/2019 | |
|---|---|---|---|---|
| CN | 109337719 A | * | 2/2019 | ................ C10L 1/00 |

(Continued)

OTHER PUBLICATIONS

CN-109337719-A Translation (Year: 2019).*
(Continued)

*Primary Examiner* — Ellen M Mcavoy
*Assistant Examiner* — Chantel Graham
(74) *Attorney, Agent, or Firm* — Dority & Manning, PA

(57) ABSTRACT

The present invention provides a high-energy-density slurry fuel, a preparation method, and an application. The high-energy-density slurry fuel comprises the following components in percentage by mass: 3%-40% of aluminum-based-metal hydride composite fuel; 53.6%-96% of high-density liquid hydrocarbon fuel; 0.2%-2% of anti-settling agent; and 0.2%-5% of other performance regulators, wherein an aluminum-based-metal hydride is a composite material that disperses and distributes a metal hydride inside aluminum powder particles. The high-energy-density slurry fuel may be used as a fuel for an engine such as a ramjet engine or a rocket engine. Compared with the existing liquid fuel, the present high-energy-density slurry fuel has the characteris-
(Continued)

tics of high density ($\rho_{20°C} > 0.9$ g/cm3), high heat value (greater than 38 MJ/kg), rapid ignition, and efficient combustion; and compared with the existing slurry fuel, the present high-energy-density slurry fuel has the advantages of rapid ignition, efficient combustion, and no residue or less residue in combustion products.

12 Claims, 1 Drawing Sheet

(52) U.S. Cl.
CPC . *C10L 2200/0218* (2013.01); *C10L 2200/043* (2013.01); *C10L 2230/22* (2013.01); *C10L 2270/04* (2013.01)

(58) Field of Classification Search
CPC ........... C10L 2200/043; C10L 2230/22; C10L 2270/04; C10L 8/00; C10L 1/04; C10L 1/10; C10L 1/1208; C10L 1/1824; C10L 1/1883; C10L 1/231; C10L 1/232; C10L 1/305; C10L 1/322; C10L 10/00; C10L 2200/0231; C10L 2200/024; C10L 2250/06; C10L 2290/28

See application file for complete search history.

(56) References Cited

FOREIGN PATENT DOCUMENTS

| | | |
|---|---|---|
| CN | 111732978 | 10/2020 |
| CN | 111825507 | 10/2020 |
| CN | 114032127 | 2/2022 |
| JP | 2009126874 | 6/2009 |

OTHER PUBLICATIONS

PCT International Search Report (with English translation) for corresponding PCT Application No. PCT/CN2022/114974, mailed Nov. 30, 2022, 5 pages.

Written Opinion of the International Searching Authority for corresponding PCT Application No. PCT/CN2022/114974, mailed Nov. 30, 2022, 4 pages.

* cited by examiner

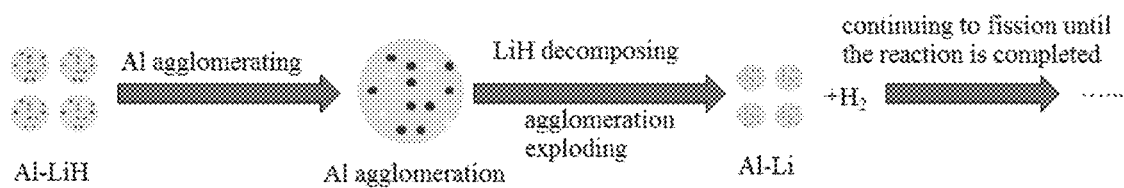

HIGH-ENERGY-DENSITY SLURRY FUEL, PREPARATION METHOD, AND APPLICATION

This application is the national phase of International Application No. PCT/CN2022/114974, entitled "HIGH-ENERGY-DENSITY SLURRY FUEL, PREPARATION METHOD, AND APPLICATION" and filed on Aug. 26, 2022, which claims priority to Chinese Patent Application No. 202110988405.0, entitled "HIGH-ENERGY-DENSITY SLURRY FUEL, PREPARATION METHOD, AND APPLICATION" and filed on Aug. 26, 2021 with the China National Intellectual Property Administration, both of which are incorporated herein by reference in entirety for all purposes.

FIELD

The present disclosure relates to the field of fuel technology and in particular to a high-energy-density slurry fuel, preparation method therefor and application thereof.

BACKGROUND

Liquid hydrocarbon fuel plays an important role in aviation and aerospace fields, and performance of the fuel (especially energy and density) is one of the keys to determine flight performance (range, speed, etc.). The development of high-performance aircraft has put forward high requirements for the propulsion capability of fuel. High-density fuel has a great mass density and a volumetric calorific value, which can provide more energy without increasing the size of the fuel tank, and is an important fuel for quickly improving the flight performance at low cost.

Addition of metal fuels to liquid fuels can not only significantly improve fuel combustion performance, but also significantly increase energy density. Aluminum powder has a low melting point, a moderate metal activity, a good storage stability, a low oxygen consumption, a high density, abundant raw materials, and a low cost, and is an ideal metal fuel. Studies have shown that adding a certain proportion of aluminum powder to the liquid fuel can not only greatly increase the density specific impulse of the fuel, but also inhibit the unstable combustion of the fuel to a certain extent. However, in the actual combustion process, since Al has a low melting point (933 K) and a high ignition point of about 2300 K (equivalent to the ignition point of $Al_2O_3$), in order to ignite and burn Al, the ignition temperature must be increased to melt, expand, and break the $Al_2O_3$ hard shell coated on the surface of Al, so that pure Al can be exposed to hot fuel gas to form a gas-phase combustion flame. Aluminum powder is easy to agglomerate, and its combustion is insufficient. Residues are easy to deposit on the inner surface of an engine, which will not only reduce the combustion efficiency, but also reduce the payload of the engine. In severe cases, it will cause the aircraft to fail to launch. In the engine test, the incomplete combustion and deposition phenomena of the hydrocarbon fuel with Al powder added are very significant.

Although nano-aluminum powder has a higher combustion efficiency, the nano-aluminum powder is in a highly activated state due to its special surface effect, and is easy to interact with gas and liquid molecules in the environment, making the nano-aluminum particles easily oxidized and deactivated, so that the surface of the nano-aluminum particles is covered with a thin layer of 2-6 nm aluminum oxide. The content of active aluminum will decrease significantly as the particle size decreases, seriously affecting its energy performance.

Therefore, how to make the high-density slurry fuel added with aluminum powder not only has a higher energy performance, but also has a better combustion performance is a focus and difficult issue that scientific researchers in this field need to solve.

SUMMARY

In order to overcome the deficiencies in the existing technology, the inventors have conducted intensive research and provided a high-energy-density slurry fuel and preparation method therefor. The fuel has advantages of high density, high energy, excellent ignition and combustion performance, and less residue of combustion products, thereby completing the present disclosure.

The following technical solutions are provided in the present disclosure.

In a first aspect, provided is a high-energy-density slurry fuel, comprising the following components in mass percentage:

aluminum-based metal hydride composite fuel: 3%-40%;
liquid hydrocarbon fuel: 53.6%-96%;
anti-settling agent: 0.2%-2%;
other performance modifiers: 0.2%-5%;
wherein the aluminum-based metal hydride is a composite material in which the metal hydride is dispersedly distributed inside the aluminum powder particles.

In a second aspect, provided is a method for preparing a high-energy-density slurry fuel, comprising the following steps: adding liquid hydrocarbon fuel, aluminum-based metal hydride composite fuel, anti-settling agent and other performance modifiers in a mixer according to a ratio of each component, and mixing then at room temperature to a uniform slurry to obtain the high-energy-density slurry fuel.

In a third aspect, provided is use of the high-energy-density slurry fuel according to the first aspect as a fuel for an engine such as a ramjet engine or a rocket engine.

The high-energy-density slurry fuel, preparation method therefor and application thereof provided according to the present disclosure have the following beneficial effects:

(1) In the high-energy-density slurry fuel provided by the present disclosure, Al—LiH composite fuel is used instead of Al powder. During the combustion process of the Al—LiH composite fuel, due to the property of LiH that it decomposes at a temperature (850° C.), which is slightly higher than the melting point of aluminum powder (660° C.), to generate gas ($H_2$), a "micro-explosion" effect is formed inside the metal agglomeration. The large agglomerate explodes and disperses into numerous Al—Li droplets. At the same time, the presence of $H_2$ can effectively improve the combustion performance of the metal powder. Due to the characteristic that the boiling point of Li is significantly lower than that of Al (the boiling point of Al is 2327° C. and the boiling point of Li is 1340° C.), the Al—Li continuously explodes into smaller droplets and enters the gas phase combustion, which not only makes the aluminum powder burn more fully, but also greatly can reduce the size of condensed phase combustion products and reduce the two-phase flow loss.

(2) The high-energy-density slurry fuel provided by the present disclosure has advantages of good anti-settling performance and long-term stable storage.

(3) Compared with the existing liquid fuel, the high-energy-density slurry fuel provided by the present disclosure has the advantages of high density ($\rho_{20°C}$>0.9 g/cm$^{-3}$), high calorific value (higher than 38 MJ/kg), rapid ignition, and high-efficiency combustion. Compared with the existing slurry fuel, it has the advantages of rapid ignition, high-efficiency combustion, and no residue or less residue in combustion products.

BRIEF DESCRIPTION OF THE DRAWINGS

FIG. 1 is a schematic diagram of a combustion mechanism of the Al—LiH composite fuel.

DETAILED DESCRIPTION OF EMBODIMENTS

The present disclosure is described in detail as follows. The features and advantages of the present disclosure will become more clear and definite along with these descriptions.

The word "exemplary" is used exclusively herein to mean "serving as an example, an embodiment, or an illustration". Any embodiment described herein as "exemplary" is not necessarily to be construed as superior or better than other embodiments.

According to the first aspect of the present disclosure, provided is a high-energy-density slurry fuel, comprising following components in mass percentage:
  aluminum-based metal hydride composite fuel: 3%-40%;
  liquid hydrocarbon fuel: 53.6%-96%;
  anti-settling agent: 0.2%-2%;
  other performance modifiers: 0.2%-5%;
  wherein the aluminum-based metal hydride is a composite material in which a metal hydride is dispersedly distributed inside aluminum powder particles, and the dispersed distribution refer to embedding the metal hydride inside the aluminum powder particles by means such as ball milling to form a structure of coating metal hydrides with aluminum powder.

In a preferred embodiment, the high-energy-density slurry fuel, based on the sum of the mass percentages of the components being 100%, comprises the following components in mass percentage: aluminum-based metal hydride composite fuel: 10%-25%; liquid hydrocarbon fuel: 74%-90%; anti-settling agent: 0.5%-2%; other performance modifiers: 0.2%-3%.

In a preferred embodiment, the aluminum-based metal hydride composite fuel is an Al—LiH composite fuel. The Al—LiH composite fuel is a powder composed of main phase aluminum and dispersed phase lithium hydride, wherein LiH is in a mass proportion of 2%-30%, preferably 5%-25%. The Al—LiH composite fuel is micron-sized, with a median particle size D50 of 5-30 μm.

The Al—LiH composite fuel is prepared by a method comprising: weighing aluminum powder and lithium hydride in a glove box, mixing them uniformly, and then putting them into a ball mill tank, sealing the ball mill tank, and ball milling them in a ball mill to obtain the Al—LiH composite fuel.

The aluminum powder is micron aluminum powder, and its specification is any one of FLQT1 (with a median particle size of 29±3 μm), FLQT2 (with a median particle size of 24±3 μm), FLQT3 (with a median particle size of 13±2 μm), FLQT4 (with a median particle size of 6±1.5 μm), FLQT5 (with a median particle size of 2±1 μm), or a combination thereof.

The lithium hydride is in a micron size, with a median particle size D50 of 1 μm to 15 μm.

In the present disclosure, the ball mill is any one of a planetary ball mill, a horizontal ball mill and a conical ball mill.

When grinding, the ball-to-material ratio (that is, the mass ratio of the grinding balls of the ball mill to the material) is (10-50): 1.

The speed of the ball mill is 200 r/min to 400 r/min, and the duration of the ball milling is 30 min to 10 h.

Researches have found that the particle size of the aluminum powder and the lithium hydride, the rotation speed and the duration of the ball milling are closely related to the dispersion state of LiH in Al powder. The particle size of aluminum powder and lithium hydride is within the above range. By optimizing the ball milling process, the dispersed distribution of LiH in the Al powder can be realized. If the rotation speed is lower than the above range and the duration of the ball milling is shorter than the above range, the LiH is difficult to be dispersedly distributed in the Al powder: if the rotation speed is higher than the above range and the duration of the ball milling is longer than the above range, the particle size is too small, the aluminum powder has a large specific surface area, is easy to oxidize, and has low fuel energy.

The basic performance of the fuel is its ability to reliably realize the smooth conversion of chemical energy storage into gas kinetic energy to meet the application requirements of various engines. The Al—LiH composite fuel is used to replace Al powder for high-energy-density slurry fuel. The Al—LiH composite fuel is micron-sized on a macroscopic level, and the LiH is dispersedly distributed inside the aluminum powder on a microscopic level. During the combustion process of Al—LiH composite fuel, without the participation of water, due to the property of LiH that it decomposes at a temperature (850° C.), which is slightly higher than the melting point of aluminum powder (660° C.), to generate gas ($H_2$), a "micro-explosion" effect is formed inside the metal agglomeration. The large agglomerate explodes and disperses into numerous Al—Li droplets. Furthermore, due to the characteristic that the boiling point of Li is significantly lower than that of Al (the boiling point of Al is 2327° C. and the boiling point of Li is 1340° C.), Li gasifies at high temperature, and Al—Li continuously explodes into smaller droplets and enters the gas phase combustion, which not only makes the aluminum powder burn more fully, but also greatly can reduce the size of condensed phase combustion products and reduce the two-phase flow loss. The combustion mechanism of the Al—LiH composite fuel is shown in FIG. 1.

The mass percentage content of the aluminum-based metal hydride composite fuel in the slurry fuel is in a range of 3% to 40%. If the content is lower and less than a minimum value of the above range, it will have no significant effect on the improvement of combustion performance and the increase of energy density of the fuel: if the content is higher and higher than the maximum value of the above range, there will be problems of insufficient fluidity of the slurry fuel and poor processability.

In a preferred embodiment, the liquid hydrocarbon fuel is a petroleum distillation product or/and a synthetic hydrocarbon, with a calorific value of ≥40 MJ·kg$^-$ and a density of ≥0.78 g·cm$^{-3}$.

Furthermore, the petroleum distillation product is selected from one or more of No. 1 jet fuel RP-1, No. 2 jet fuel RP-2, No. 3 jet fuel RP-3, No. 4 jet fuel RP-4 or No. 5 jet fuel RP-5.

Furthermore, the synthetic hydrocarbon is selected from one or both of tetrahydrodicyclopentadiene or quadricyclane.

In a preferred embodiment, the anti-settling agent is white carbon black. The amount of white carbon black is crucial to the settling performance and energy performance of the slurry fuel. If the amount of white carbon black is too high and higher than 2%, the energy performance of the fuel will be affected. If the amount of white carbon black is too low and lower than 0.2%, the anti-settling performance of the fuel will decrease.

In a preferred embodiment, the other performance modifiers are used to adjust the combustion performance, flow performance and antioxidant performance of the high-energy-density slurry fuel, and are selected from one or more of iron oxide, octyl ferrocene, catocene, 3-amino-1,2,4-triazole copper perchlorate, copper chromite, ammonium oxalate, sodium oxalate, diethyl oxalate, nitromethane, isopropanol, octyl nitrate or isooctyl nitrate.

According to the second aspect of the present disclosure, a method for preparing the high-energy-density slurry fuel is provided, the method comprising the following steps: adding liquid hydrocarbon fuel, aluminum-based metal hydride composite fuel, anti-settling agent and other performance modifiers in a mixer according to a ratio of each component, mixing them at room temperature to a uniform slurry to obtain the high-energy-density slurry fuel.

According to the third aspect of the present disclosure, use of the high-energy-density slurry fuel according to the first aspect as a fuel for an engine such as a ramjet or a rocket engine is provided.

EXAMPLES

In order to enable those skilled in the art to better understand the present disclosure, the present disclosure can be further described in detail below in conjunction with specific examples. The calorific value is measured according to "QGT219-2001", the density is measured according to "GJB770B-401-2", the content of active aluminum in the residue is measured according to "GJB1738A", and the combustion efficiency is calculated from the ratio of the measured calorific value to the theoretical calorific value.

Example 1

(1) Composition of the fuel composition

| Formula composition | Content/% |
| --- | --- |
| Al—2LiH ($D_{50}$ 30 μm) | 3 |
| Tetrahydrodicyclopentadiene | 96 |
| White carbon black | 0.8 |
| Nitromethane | 0.2 |

The method for preparing the high-energy-density slurry fuel was as follows. Tetrahydrodicyclopentadiene, Al—LiH, white carbon black, and nitromethane were added in a 5 L vertical mixer according to the above ratio, and mixed at room temperature for 45 minutes to a uniform slurry to obtain a high-energy-density slurry fuel.

The method for preparing the Al-2LiH was as follows. 9.8 g FLQT3 aluminum powder and 0.2 g LiH ($D_{50}$ was 2 μm) were mixed uniformly in a glove box and poured into the ball mill tank, and the ball mill tank was sealed and then the mixture was taken out and milled on a planetary ball mill at a speed of 200 r/min for 8 hours in which the ball-to-material ratio was 10:1, to obtain the Al-2LiH composite fuel.

(2) Performance of the fuel

| | |
| --- | --- |
| Measured calorific value Hu/MJ · $kg^{-1}$ | 40.5 |
| Density $\rho_{20° C.}$/g · $cm^{-3}$ | 0.954 |
| Combustion efficiency/% | 98 |
| Content of active aluminum in residue/% | 0.02 |

It can be known from Example 1 that the measured calorific value=40.5 MJ·$kg^{-1}$ (greater than 38 MJ·$kg^{-1}$), the density=0.954 g·$cm^{-3}$ ($\rho_{20° C.}$>0.9 g·$cm^{-3}$), the combustion efficiency=98%, the content of the active aluminum in the residue=0.02%. The fuel has advantages of high density, high energy, fast ignition speed and high combustion efficiency.

Example 2

(1) Composition of the fuel composition

| Formula composition | Content/% |
| --- | --- |
| Al—25LiH ($D_{50}$ 8 μm) | 18.5 |
| Quadricyclane | 80 |
| White carbon black | 0.5 |
| Octyl ferrocene | 1 |

The method for preparing the high-energy-density slurry fuel was the same as that in Example 1.

The method for preparing the Al-25LiH was as follows. 7.5 g FLQT1 aluminum powder and 2.5 g LiH ($D_{50}$ was 2 μm) were mixed uniformly in a glove box and poured into the ball mill tank, and the ball mill tank was sealed and then the mixture was taken out and milled on a planetary ball mill at a speed of 300 r/min for 3 h in which the ball-to-material ratio was 20:1, to obtain the Al-25LiH composite fuel.

(2) Performance of the propellant

| | |
| --- | --- |
| Measured calorific value Hu/MJ · $kg^{-1}$ | 40.9 |
| Density $\rho_{20° C.}$/g · $cm^{-3}$ | 1.067 |
| Combustion efficiency/% | 99 |
| Content of active aluminum in residue/% | 0 |

It can be known from Example 2 that the measured calorific value=40.9 MJ·$kg^{-1}$ (greater than 38 MJ·$kg^{-1}$), the density=1.067 g·$cm^{-3}$ ($\rho_{20° C.}$>0.9 g $cm^{-3}$), the combustion efficiency=99%, the content of the active aluminum in the residue=0. The fuel has the advantages of high density, high energy, fast ignition speed and high combustion efficiency.

Example 3

(1) Composition of the fuel composition

| Formula composition | Content/% |
| --- | --- |
| Al—10LiH ($D_{50}$ 20 μm) | 40 |
| RP-3 | 53.6 |
| White carbon black | 1.4 |
| Isopropanol | 3 |

-continued

| (1) Composition of the fuel composition | |
| --- | --- |
| Formula composition | Content/% |
| Octyl ferrocene | 1 |
| Isooctyl nitrate | 1 |

The method for preparing the high-energy-density slurry fuel was the same as that in Example 1.

The method for preparing the Al-10LiH was as follows.

9.0 g FLQT1 aluminum powder and 1.0 g LiH ($D_{50}$ was 2 μm) were mixed uniformly in a glove box and poured into the ball mill tank, and the ball mill tank was sealed and then the mixture was taken out and milled on a planetary ball mill at a speed of 300 r/min for 5 hours in which the ball-to-material ratio was 25:1, to obtain the Al-10LiH composite fuel.

| (2) Performance of the propellant | |
| --- | --- |
| Measured calorific value Hu/MJ · kg$^{-1}$ | 38.9 |
| Density $\rho_{20°\,C}$/g · cm$^{-3}$ | 1.075 |
| Combustion efficiency/% | 98.5 |
| Content of active aluminum in residue/% | 0.05 |

It can be known from Example 3 that the measured calorific value=38.9 MJ·kg$^{-1}$ (greater than 38 MJ·kg$^{-1}$), the density=1.075 g·cm$^{-3}$ ($\rho_{20°\,C}$>0.9 g·cm$^{-3}$), the combustion efficiency=98.5%, the content of the active aluminum in the residue=0.05%. The fuel has advantages of high density, high energy, fast ignition speed and high combustion efficiency.

Example 4

| (1) Composition of the fuel composition | |
| --- | --- |
| Formula composition | Content/% |
| Al—20LiH ($D_{50}$ 10 μm) | 20.6 |
| Tetrahydrodicyclopentadiene | 74.8 |
| White carbon black | 2 |
| Iron oxide | 1 |
| Isopropanol | 1 |
| Copper chromite | 0.6 |

The method for preparing the high-energy-density slurry fuel was the same as that in Example 1.

The method for preparing the Al-20LiH was as follows.

8.0 g FLQT5 aluminum powder and 2.0 g LiH ($D_{50}$ was 2 μm) were mixed uniformly in a glove box and poured into the ball mill tank, and the ball mill tank was sealed and then the mixture was taken out and milled on a planetary ball mill at a speed of 300 r/min for 8 hours in which the ball-to-material ratio was 30:1, to obtain the Al-20LiH composite fuel.

| (2) Performance of the propellant | |
| --- | --- |
| Measured calorific value Hu/MJ · kg$^{-1}$ | 38.4 |
| Density $\rho_{20°\,C}$/g · cm$^{-3}$ | 1.06 |
| Combustion efficiency/% | 99.5 |
| Content of active aluminum in residue/% | 0 |

It can be known from Example 4 that the measured calorific value=38.4 MJ·kg$^{-1}$ (greater than 38 MJ·kg$^{-1}$), the density=1.06 g·cm$^{-3}$ ($\rho_{20°\,C}$>0.9 g·cm$^{-3}$), the combustion efficiency=99.5%, the content of the active aluminum in the residue=0. The fuel has advantages of high density, high energy, fast ignition speed and high combustion efficiency.

Example 5

| (1) Composition of the fuel composition | |
| --- | --- |
| Formula composition | Content/% |
| Al—30LiH ($D_{50}$ 5 μm) | 38 |
| Quadricyclane | 60 |
| White carbon black | 0.2 |
| Catocene | 1.8 |

The method for preparing the high-energy-density slurry fuel was the same as that in Example 1.

The method for preparing the Al-30LiH was as follows.

7.0 g FLQT5 aluminum powder and 3.0 g LiH ($D_{50}$ was 2 μm) were mixed uniformly in a glove box and poured into the ball mill tank, and the ball mill tank was sealed and then the mixture was taken out and milled on a planetary ball mill at a speed of 300 r/min for 5 hours in which the ball-to-material ratio was 40:1, to obtain the Al-30LiH composite fuel.

| (2) Performance of the propellant | |
| --- | --- |
| Measured calorific value Hu/MJ · kg$^{-1}$ | 39.1 |
| Density $\rho_{20°\,C}$/g · cm$^{-3}$ | 1.153 |
| Combustion efficiency/% | 98.9 |
| Content of active aluminum in residue/% | 0.02 |

It can be known from Example 5 that the measured calorific value=39.1 MJ·kg$^{-1}$ (greater than 38 MJ·kg$^{-1}$), the density=1.153 g·cm$^{-3}$ ($\rho_{20°\,C}$>0.9 g·cm$^{-3}$), the combustion efficiency=98.9%, the content of the active aluminum in the residue=0.02%. The fuel has advantages of high density, high energy, fast ignition speed and high combustion efficiency.

Example 6

| (1) Composition of the fuel composition | |
| --- | --- |
| Formula composition | Content/% |
| Al—15LiH ($D_{50}$ 15 μm) | 10 |
| Quadricyclane | 88 |
| White carbon black | 1.1 |
| Iron oxide | 0.9 |

The method for preparing the high-energy-density slurry fuel was the same as that in Example 1.

The method for preparing the Al-15LiH was as follows.

8.5 g FLQT3 aluminum powder and 1.5 g LiH (D50 was 14 μm) were mixed uniformly in a glove box and poured into the ball mill tank, and the ball mill tank was sealed and then the mixture was taken out and milled on a planetary ball mill at a speed of 250 r/min for 5 hours in which the ball-to-material ratio was 20:1, to obtain the Al-15LiH composite fuel.

| (2) Performance of propellant | |
| --- | --- |
| Measured calorific value Hu/MJ · kg$^{-1}$ | 41.3 |
| Density $\rho_{20° C}$/g · cm$^{-3}$ | 1.048 |
| Combustion efficiency/% | 99.5 |
| Content of active aluminum in residue/% | 0.01 |

It can be known from Example 6 that the measured calorific value=41.3 MJ·kg$^{-1}$ (greater than 38 MJ·kg$^{-1}$), the density=1.048 g·cm$^{-3}$ ($\rho_{20° C}$>0.9 g·cm$^{-3}$), the combustion efficiency=99.5%, the content of the active aluminum in the residue=0.01%. The fuel has advantages of high density, high energy, fast ignition speed and high combustion efficiency.

Example 7

| (1) Composition of the fuel composition | |
| --- | --- |
| Formula composition | Content/% |
| Al—16LiH (D$_{50}$ 13 μm) | 21.5 |
| Tetrahydrodicyclopentadiene | 74 |
| White carbon black | 1.5 |
| Octylferrocene | 2 |
| Nitromethane | 1 |

The method for preparing the high-energy-density slurry fuel was the same as that in Example 1.

The method for preparing the Al-16LiH was as follows.

8.4 g FLQT1 aluminum powder and 1.6 g LiH (D$_{50}$ was 14 μm) were mixed uniformly in a glove box and poured into the ball mill tank, and the ball mill tank was sealed and then the mixture was taken out, and milled on a planetary ball mill at a speed of 300 r/min for 3 hours in which the ball-to-material ratio was 25:1, to obtain the Al-16LiH composite fuel.

| (2) Propellant performance | |
| --- | --- |
| Measured calorific value Hu/MJ · kg$^{-1}$ | 38.6 |
| Density $\rho_{20° C}$/g · cm$^{-3}$ | 1.067 |
| Combustion efficiency/% | 99.2 |
| Content of active aluminum in residue/% | 0.02 |

It can be known from Example 7 that the measured calorific value=38.6 MJ·kg$^{-1}$ (greater than 38 MJ·kg$^{-1}$), the density=1.067 g cm$^{-3}$ ($\rho_{20° C}$>0.9 g·cm$^{-3}$), the combustion efficiency=99.2%, the content of the active aluminum in the residue=0.02%, which has the advantages of high density, high energy, fast ignition speed and high combustion efficiency.

COMPARATIVE EXAMPLES

| Comparative example 1 Composition of the fuel composition | |
| --- | --- |
| Formula composition | Content/% |
| Al—2LiH (D$_{50}$ 30 μm) | 2 |
| Tetrahydrodicyclopentadiene | 97 |
| White carbon black | 0.8 |
| Nitromethane | 0.2 |

The method for preparing the slurry fuel and Al-2LiH was the same as that in Example 1.

The above-mentioned slurry fuel was subjected to a settling test. After 3 days, visual inspection showed that the fuel was stratified with metal powder at the bottom layer and liquid fuel at the upper layer. It can be seen that reducing the Al—LiH content is not conducive to the stable storage performance of the fuel.

| Comparative example 2 Composition of the fuel composition | |
| --- | --- |
| Formula composition | Content/% |
| Al—10LiH (D$_{50}$ 20 μm) | 45 |
| RP-3 | 48.6 |
| White carbon black | 1.4 |
| Isopropanol | 3 |
| Octylferrocene | 1 |
| Isooctyl nitrate | 1 |

The method for preparing the slurry fuel was as follows. RP-3, Al—LiH, white carbon black, isopropanol, octylferrocene and isooctyl nitrate were added in a 5 L vertical mixer according to the above ratio, and mixed at room temperature. Since the viscosity of the fuel was high, the powder was agglomerated and difficult to disperse, and a uniform slurry fuel cannot be obtained.

The method for preparing the Al-10LiH was the same as that in Example 3.

| Comparative example 3 Composition of the fuel composition | |
| --- | --- |
| Formula composition | Content/% |
| Al—20LiH (D$_{50}$ 10 μm) | 20.6 |
| Tetrahydrodicyclopentadiene | 71.8 |
| White carbon black | 5 |
| Iron oxide | 1 |
| Isopropanol | 1 |
| Copper chromite | 0.6 |

The method for preparing the slurry fuel was the same as that in Example 1.

The method for preparing the Al-20LiH was the same as that in Example 4.

| | |
| --- | --- |
| Measured calorific value Hu/MJ · kg$^{-1}$ | 33.5 |
| Density $\rho_{20° C}$/g · cm$^{-3}$ | 1.084 |
| Combustion efficiency/% | 90 |
| Content of active aluminum in residue/% | 1 |

Compared with Example 4, the anti-settling performance of the fuel was equivalent (it could be stored stably within one month), but the calorific value of the fuel was significantly reduced, and the combustion efficiency was reduced. It can be seen that an excessive white carbon black will affect the combustion efficiency and energy performance of the fuel.

Comparative example 4
Composition of the fuel composition

| Formula composition | Content/% |
|---|---|
| Al—30LiH (D$_{50}$ 5 μm) | 38 |
| Quadricyclane | 60 |
| White carbon black | 0.05 |
| Catocene | 1.95 |

The method for preparing the slurry fuel was the same as that in Example 1.

The method for preparing the Al-30LiH was the same as that in Example 5.

The above-mentioned slurry fuel was subjected to a settling test. After one week, visual inspection showed that the fuel was stratified with metal powder at the bottom layer and liquid fuel at the upper layer.

Comparative example 5
(1) Composition of the fuel composition

| Formula composition | Content/% |
|---|---|
| Aluminum powder (D$_{50}$ 28 μm) | 3 |
| Tetrahydrodicyclopentadiene | 96 |
| White carbon black | 0.8 |
| Nitromethane | 0.2 |

The method for preparing the slurry fuel was as follows. Tetrahydrodicyclopentadiene, Al powder, white carbon black, and nitromethane were added in a 5 L vertical mixer according to the above ratio, and mixed at room temperature for 45 minutes to a uniform slurry.

(2) Performance of the fuel

| | |
|---|---|
| Measured calorific value Hu/MJ · kg$^{-1}$ | 39 |
| Density $\rho_{20°C}$/g · cm$^{-3}$ | 0.958 |
| Combustion efficiency/% | 93 |
| Content of active aluminum in residue/% | 0.2 |

It can be known from Comparative Example 5 that the measured calorific value=39 MJ·kg$^{-1}$, the density=0.958 g·cm$^{-3}$, the combustion efficiency=93%, the active aluminum content in the residue=0.2%. Compared with the fuel in the formula of Example 1, there are problems of incomplete combustion and deposition phenomena.

The present disclosure has been described in detail above in conjunction with specific implementations and exemplary embodiments, but these descriptions should not be construed as limiting the present disclosure. Those skilled in the art understand that without departing from the spirit and scope of the present disclosure, various equivalent replacements, modifications or improvements can be made to the technical solutions and implementations of the present disclosure, all of which fall within the scope of the present disclosure. The protection scope of the present disclosure shall be determined by the appended claims.

The content that is not described in detail in the description of the present disclosure belongs to the well-known technology of those skilled in the art.

The invention claimed is:

1. A high-energy-density slurry fuel, comprising the following components in mass percentage:
   aluminum-based metal hydride composite fuel: 3%-40%;
   liquid hydrocarbon fuel: 53.6%-96%;
   anti-settling agent: 0.2%-2%;
   other performance modifiers: 0.2%-5%;
   wherein the aluminum-based metal hydride is a composite material in which a metal hydride is dispersedly distributed inside aluminum powder particles.

2. The high-energy-density slurry fuel according to claim 1, wherein the aluminum-based metal hydride composite fuel is an Al-LiH composite fuel.

3. The high-energy-density slurry fuel according to claim 2, wherein a mass percentage of Al and LiH in the Al-LiH composite fuel is:
   LiH: 2%-30%; and
   Al: balance.

4. The high-energy-density slurry fuel according to claim 2, wherein a median particle size D50 of the Al-LiH composite fuel is in a range of 5-30 μm.

5. The high-energy-density slurry fuel according to claim 2, wherein the Al-LiH composite fuel is prepared by a method comprising: weighing aluminum powder and lithium hydride, mixing them uniformly and then putting them into a ball mill tank, sealing the ball mill tank and ball milling them in a ball mill to obtain the Al-LiH composite fuel.

6. The high-energy-density slurry fuel according to claim 1, wherein the liquid hydrocarbon fuel is a petroleum distillation product or/and a synthetic hydrocarbon, with a calorific value of ≥40 MJ·kg$^{-1}$ and a density of ≥0.78 g·cm$^{-3}$.

7. The high-energy-density slurry fuel according to claim 6, wherein the petroleum distillation product is selected from one or more of No. 1 jet fuel RP-1, No. 2 jet fuel RP-2, No. 3 jet fuel RP-3, No. 4 jet fuel RP-4 or No. 5 jet fuel RP-5.

8. The high-energy-density slurry fuel according to claim 6, wherein the synthetic hydrocarbon is selected from one or both of tetrahydrodicyclopentadiene or quadricyclane.

9. The high-energy-density slurry fuel according to claim 1, wherein the anti-settling agent is white carbon black.

10. The high-energy-density slurry fuel according to claim 1, wherein the other performance modifier is one or more selected from iron oxide, octylferrocene, catocene, 3-amino-1,2,4-triazole copper perchlorate, copper chromite, ammonium oxalate, sodium oxalate, diethyl oxalate, nitromethane, isopropanol, octyl nitrate or isooctyl nitrate.

11. A method for preparing a high-energy-density slurry fuel, comprising the following steps: adding liquid hydrocarbon fuel, aluminum-based metal hydride composite fuel, anti-settling agent and other performance modifiers in a mixer according to a ratio of each component, and mixing them at room temperature to a uniform slurry to obtain the high-energy-density slurry fuel.

12. A method for preparing a fuel for an engine, comprising using the high-energy-density slurry fuel according to claim 1.

* * * * *